(12) United States Patent
Jung et al.

(10) Patent No.: US 11,664,856 B2
(45) Date of Patent: May 30, 2023

(54) METHOD AND APPARATUS FOR SAVING USER EQUIPMENT POWER WITH MIMO OPERATION

(71) Applicant: Lenovo (Singapore) Pte. Ltd., New Tech Park (SG)

(72) Inventors: Hyejung Jung, Northbrook, IL (US); Ziad Ahmad, Santa Clara, CA (US); Vijay Nangia, Woodridge, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 18 days.

(21) Appl. No.: 17/516,649

(22) Filed: Nov. 1, 2021

(65) Prior Publication Data

US 2022/0060223 A1 Feb. 24, 2022

Related U.S. Application Data

(63) Continuation of application No. 16/672,666, filed on Nov. 4, 2019, now Pat. No. 11,165,472.

(60) Provisional application No. 62/755,354, filed on Nov. 2, 2018.

(51) Int. Cl.
*H04B 7/02* (2018.01)
*H04B 7/0417* (2017.01)
*H04W 52/02* (2009.01)
*H04W 48/20* (2009.01)
*H04W 72/12* (2023.01)
*H04W 80/02* (2009.01)

(52) U.S. Cl.
CPC .......... *H04B 7/0417* (2013.01); *H04W 48/20* (2013.01); *H04W 52/0212* (2013.01); *H04W 72/1289* (2013.01); *H04W 80/02* (2013.01)

(58) Field of Classification Search
CPC ................ H04B 7/0417; H04W 48/20; H04W 52/0212; H04W 72/1289; H04W 80/02
USPC ................ 375/267, 260, 259, 219, 296, 316
See application file for complete search history.

(56) References Cited

U.S. PATENT DOCUMENTS

2019/0281587 A1* 9/2019 Zhang ................... H04W 72/10

* cited by examiner

*Primary Examiner* — Zewdu A Kassa
(74) *Attorney, Agent, or Firm* — Loppnow & Chapa

(57) ABSTRACT

A method and a network entity are provided. A set of transmission configuration indicator state configurations are transmitted to a user equipment, via a protocol layer above the physical layer, wherein each transmission configuration indicator state includes an indication of an associated at least one downlink reference signal which is used as a quasi co-location source for a resource and a quasi co-location type associated with the at least one downlink reference signal. The at least one downlink reference signal associated with the set of transmission configuration indicator state configurations is transmitted. An indication of a first subset of transmission configuration indicator states is received from the user equipment, where the indication of the first subset includes identifying the particular transmission configuration indicator states that are part of the first subset, based on the at least one downlink reference signal associated with the set of transmission configuration indicator state configurations.

20 Claims, 5 Drawing Sheets

METHOD AND APPARATUS FOR SAVING USER EQUIPMENT POWER WITH MIMO OPERATION

FIELD OF THE INVENTION

The present disclosure is directed to a method and apparatus for saving user equipment power with multiple input multiple output (MIMO) operation, where a subset of transmission configuration indicator states, which operate using a common subset of a plurality of antenna panels in a particular user equipment, are identified for use in supporting communications with a network.

BACKGROUND OF THE INVENTION

Presently, user equipment, such as wireless communication devices, communicate with other communication devices using wireless signals, such as within a network environment that can include one or more cells within which various communication connections with the network and other devices operating within the network can be supported. Network environments often involve one or more sets of standards, which each define various aspects of any communication connection being made when using the corresponding standard within the network environment. Examples of developing and/or existing standards include new radio access technology (NR), Long Term Evolution (LTE), Universal Mobile Telecommunications Service (UMTS), Global System for Mobile Communication (GSM), and/or Enhanced Data GSM Environment (EDGE).

In an effort to enhance system performance, more recent standards have looked at different forms of spatial diversity including different forms of multiple input multiple output (MIMO) systems, which involve the use of multiple antennas at each of the source and the destination of the wireless communication for multiplying the capacity of the radio link through the use of multipath propagation. Such a system makes increasingly possible the simultaneous transmission and reception of more than one data signal using the same radio channel.

In such a system it may be possible for the transmission and reception points (TRPs) of the network to employ multiple channels or beams, which can be separately received at the various user equipment(s) (UE(s)), where each of the individual beams may be directional in nature. Correspondingly, each UE may employ multiple antenna elements, such as multiple panels and/or arrays, which are each arranged to receive signals from at least some of the various directions. By employing a plurality of panels around the device, the UE can preferably send and/or receive signals along the various directions of interest. At any given time, a particular TRP may only associate a limited subset of available channels/beams with a particular UE for supporting current communications.

The present inventors have recognized that it may be possible to define the beams being used in support of communications with a particular UE, such that only a subset of the available plurality of antenna elements in a particular UE needs to be active. By deactivating the non-needed antenna elements, the overall power requirements of the device may be reduced. In support of such a possibility it may be beneficial for the UE to communicate to the network an indication that associates at least some of each of the channels/beams with one or more particular antenna elements in the UE, which can then be used by the network to select a set of channels/beams, which allow for a reduced overall number of needed active antenna elements in the UE. Correspondingly, it may be further possible to limit the transmission of support signals, between the UE and the network based upon this information.

SUMMARY

Figure 1:
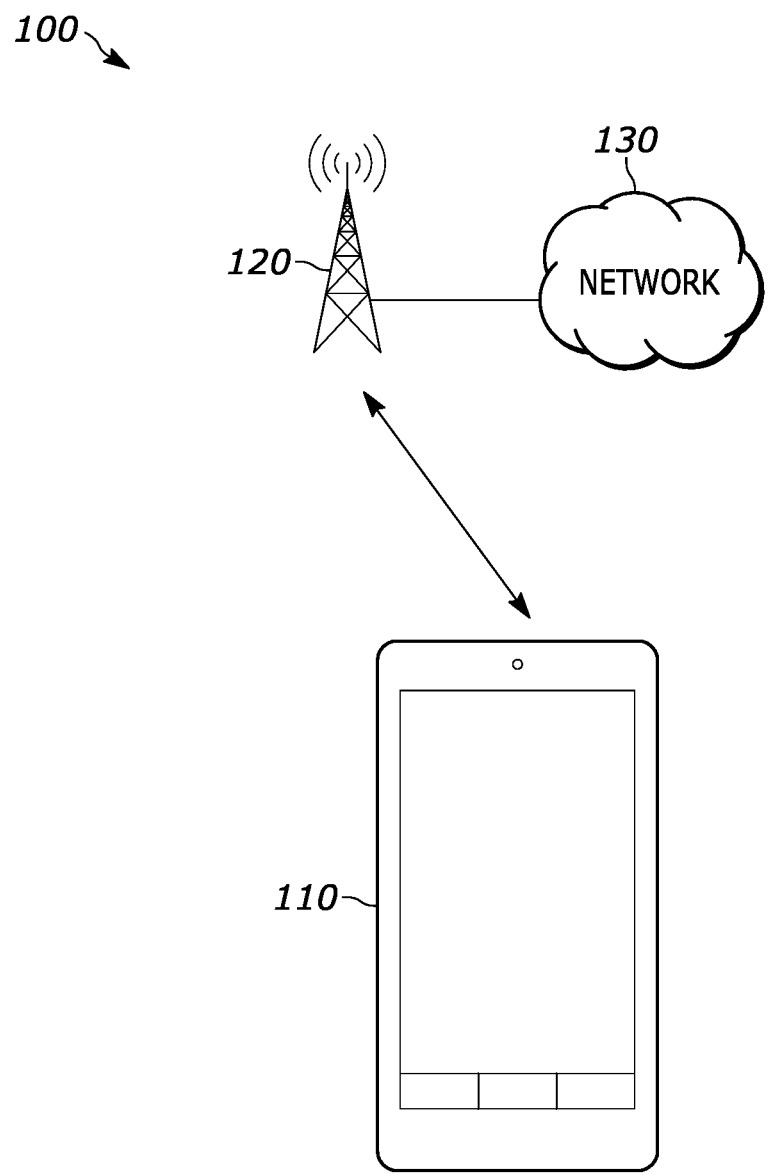
FIG. 1 is a block diagram of an exemplary network environment in which the present invention is adapted to operate.

The present application provides a method in a network entity. The method includes transmitting to a user equipment a set of transmission configuration indicator state configurations via a protocol layer above the physical layer, wherein each transmission configuration indicator state comprises an indication of an associated at least one downlink reference signal which is used as a quasi co-location source for a resource and a quasi co-location type associated with the at least one downlink reference signal. The at least one downlink reference signal associated with the set of transmission configuration indicator state configurations is transmitted. An indication of a first subset of transmission configuration indicator states is received from the user equipment, where the indication of the first subset includes identifying the particular transmission configuration indicator states that are part of the first subset, based on the at least one downlink reference signal associated with the set of transmission configuration indicator state configurations.

According to another possible embodiment, a network entity is provided. The network entity includes a controller, and a transceiver that transmits, to a user equipment, a set of transmission configuration indicator state configurations by a protocol layer above the physical layer, wherein each transmission configuration indicator state comprises an indication of an associated at least one downlink reference signal which is used as a quasi co-location source for a resource and a quasi co-location type associated with the at least one downlink reference signal. The transceiver further transmits the at least one downlink reference signal associated with the set of transmission configuration indicator state configurations. The transceiver further receives an indication of the first subset of transmission configuration indicator states from the user equipment, where the indication of the first subset includes identifying the particular transmission configuration indicator states that are part of the first subset, based on the at least one downlink reference signal associated with the set of transmission configuration indicator state configurations.

These and other features, and advantages of the present application are evident from the following description of one or more preferred embodiments, with reference to the accompanying drawings.

DETAILED DESCRIPTION OF THE PREFERRED EMBODIMENT(S)

While the present disclosure is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Embodiments provide a method and apparatus for saving user equipment power with MIMO operation.

FIG. 1 is an example block diagram of a system 100 according to a possible embodiment. The system 100 can include a wireless communication device 110, such as User Equipment (UE), a base station 120, such as an enhanced NodeB (eNB) or next generation NodeB (gNB), and a network 130. The wireless communication device 110 can be a wireless terminal, a portable wireless communication device, a smartphone, a cellular telephone, a flip phone, a personal digital assistant, a personal computer, a selective call receiver, a tablet computer, a laptop computer, or any other device that is capable of sending and receiving communication signals on a wireless network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 5th generation (5G) network, a 3rd Generation Partnership Project (3GPP)-based network, a satellite communications network, a high altitude platform network, the Internet, and/or other communications networks.

In Release-15 New Radio (NR), a user equipment (UE) may be equipped with multiple transmit and receive antenna panels to operate with narrow beams in high frequency bands (e.g. frequency bands above 6 GHz) for covering more of the entire spatial directions while minimizing and/or eliminating any coverage holes. With multiple transmission and reception points (TRPs) deployed in a cell, multiple antenna panels at the UE allow simultaneous transmission to and/or receptions from the multiple TRPs for throughput and/or reliability enhancements.

For Release-16 NR, study on UE power saving methods was initiated, and UE adaptation to traffic in terms of frequency, time, and antenna domains is currently under discussions. In the present application, methods to enable UE antenna adaptation to the traffic and related procedures are disclosed.

In Rel-15 NR, when a gNB activates a subset of Transmission Configuration Indicator (TCI) states via Medium Access Control (MAC) Control Element (CE) from a set of radio resource control (RRC) configured TCI states for a UE, gNB may not have knowledge of which subset of TCI states are associated with a common UE antenna panel (i.e. which gNB beams are received with the common UE antenna panel). If the gNB activates the TCI states which are associated with multiple UE antenna panels, the UE may have to let the associated multiple UE antenna panels (and connected radio frequency (RF) chains) remain turned on so that the UE can receive a physical downlink shared channel(s) (PDSCH(s)) based on dynamically indicated TCI state(s). In instances where there is not much downlink (and/or uplink) data for the gNB to transmit to (and/or receive from) the UE and/or there are a number of gNB beams with good radio link qualities which can be received by one or a few number of UE antenna panels (e.g. there are many good quality radio links between one TRP and one UE antenna panel), it would be beneficial to have a mechanism that allows the UE to reduce the number of "turned on" antenna panels and to perform channel state information (CSI) reporting and sounding reference signal (SRS) transmission in the power saving mode differently than in the normal operation mode.

Further details on TCI state configuration and activation and CSI resource and reporting configurations in Rel-15 NR are provided below.

TCI States Configuration and Activation

TCI States Configuration

A TCI-State configuration associates one or two downlink (DL) reference signals (RS) with a corresponding quasi-colocation (QCL) type. If the TCI field exists in downlink control information (DCI), the UE may assume that the demodulation reference signal (DM-RS) ports of the physical downlink shared channel (PDSCH) of a serving cell are quasi co-located with the reference signal(s) (RS(s)) in the TCI state with respect to the QCL type parameter(s) given by the indicated TCI state if the time offset between the reception of the downlink (DL) DCI and the corresponding PDSCH is equal to or greater than a threshold Threshold-Sched-Offset, where the threshold is based on reported UE capability. When the UE is configured with a single slot PDSCH, the indicated TCI state should be based on the activated TCI states in the slot with the scheduled PDSCH. The UE can be configured with up to M TCI-State configurations as indicated by the higher layer parameter PDSCH-Config, where M depends on UE's capability. The activation of the TCI states is described next where up to 8 TCI states can be mapped to code points of the DCI field 'Transmission Configuration Indication'.

TCI States Activation/Deactivation for UE-Specific PDSCH MAC CE

The network may activate/deactivate the configured TCI states for PDSCH of a serving cell by sending the TCI states activation/deactivation for UE-specific PDSCH medium access control-control element (MAC CE) that is identified by a MAC protocol data unit (PDU) subheader with a specific logical channel identification (LCID) and the MAC CE consisting of four fields: Serving Cell ID, Bandwidth Part (BWP) ID, Ti, and R. Serving Cell ID and BWP ID are self-explanatory. Ti is a field that takes on values of either 1 or 0 corresponding to activation or deactivation, respectively, of the TCI state with TCI-StateId i (assuming such a TCI state exists). When a TCI state is set to be activated, it is mapped to the code point of the DCI Transmission Configuration Indication field. The maximum number of activated TCI state for a specific UE, in at least some embodiments, is 8. R is a reserved bit of value 0. The configured TCI states for PDSCH are initially deactivated upon configuration and after a handover.

TCI State Indication for UE-Specific PDCCH MAC CE

The network may indicate a TCI state for PDCCH reception for a control resource set (CORESET) of a serving cell by sending the TCI State Indication for UE-specific PDCCH MAC CE that is identified by a MAC PDU subheader with a specific LCID and the MAC CE consists of the following three field: Serving Cell ID, CORESET ID, and TCI State ID. CORESET ID indicates the Control Resource Set identified with ControlResourceSetId for which the TCI State is being indicated. TCI State ID indicates the TCI state identified by TCI-StateId.

CSI Reporting by UE in Rel-15 NR

To report CSI, the UE can use the time and frequency resources as configured by gNB. CSI may include channel quality indicator (CQI), precoding matrix indicator (PMI), CSI-RS resource indicator (CRI), synchronization signal/ physical broadcast channel (SS/PBCH) block resource indicator (SSBRI), layer indicator (LI), rank indicator (RI) and/or layer 1 reference signal received power (L1-RSRP).

Reporting Settings

For reporting channel measurements, each single downlink BWP has an associated report setting, CSI-ReportConfig, that includes parameters about codebook subset restriction, time domain behavior, frequency granularity for CQI and PMI, measurement restriction configurations, and the CSI-related quantities to be reported by the UE such as layer indicator (LI), L1-RSRP, CRI, and SSB resource indicator (SSBRI). The higher layer parameter reportConfigType indicates the time domain behavior of the CSI-ReportConfig that can be set to 'aperiodic', 'semiPersistentOnPUCCH', 'semiPersistentOnPUSCH', or 'periodic'. The configured periodicity and slot offset as dictated in the numerology of the UL BWP is used in the cases of periodic and semiPersistentOnPUCCH/semiPersistentOnPUSCH. The higher layer parameter reportQuantity indicates the CSI-related or L1-RSRP-related quantities to report.

Resource Settings and Reporting Configuration

For CSI resources, each CSI Resource Setting CSI-ResourceConfig configures a list of CSI resource sets csi-RS-ResourceSetList (a higher layer parameter). The list includes references to either or both of NZP CSI-RS resource set(s) and SS/PBCH block set(s) or includes references to CSI-IM resource set(s). The DL BWP where each CSI resource setting is located is identified by the higher layer parameter bwp-id. The higher layer parameter resourceType indicates the time domain behavior of the CSI-RS resources within a CSI resource setting. It can be set to aperiodic, periodic, or semi-persistent. For periodic and semi-persistent CSI resource setting, the number of configured CSI-RS resource sets is limited to 1 and the configured periodicity and slot offset is given in the numerology of its associated DL BWP. The periodicity and slot offset for periodic and semi-persistent CSI report on the physical uplink control channel (PUCCH), and periodicity for semi-persistent CSI report on the physical uplink shared channel (PUSCH) is configured by the higher layer parameter reportSlotConfig in CSI-ReportConfig. For semi-persistent or aperiodic CSI report on PUSCH, the allowed slot offsets are configured by the higher layer parameter reportSlotOffsetList, where the offset is selected in the activating/triggering DCI.

For aperiodic CSI, when one resource setting is configured, it is generally for channel measurement for L1-RSRP computation. When two are configured, the first one is for channel measurement and the second is for interference measurement either on CSI-IM or on non zero point (NZP) CSI-RS. When three are configured, it is for channel measurement and for interference measurement on both CSI-IM and NZP CSI-RS. For periodic or semi-persistent CSI, when one resource setting is configured, it is for channel measurement for L1-RSRP computation. When two are configured, the first is for channel measurement and the second is for interference measurement on CSI-IM.

For frequency domain configuration, the reportFreqConfiguration parameter in CSI-ReportConfig can be set to indicate whether reporting is performed over 1) a contiguous or non-contiguous subset of subbands in BWP where CSI shall be transmitted, 2) wideband channel quality indicator (CQI) or subband CQI reporting, or 3) wideband or subband precoding matrix indicator (PMI). In terms of frequency granularity, CSI report setting can have either wideband or subband frequency granularity.

Report Quantities

In terms of report quantity configuration, if the UE is configured with a CSI-ReportConfig with the higher layer parameter reportQuantity set to 'cri-RSRP' or 'ssb-Index-RSRP', the UE is not required to update measurements for more than 64 CSI-RS and/or SSB resources. When reportQuantity is set to 'cri-RI-PMI-CQI', 'cri-RI-il', 'cri-RI-il-CQI' or 'cri-RI-LI-PMI-CQI', then the UE is not expected to be configured with more than 8 CSI-RS resources in a CSI-RS resource set. When reportQuantity is set to 'cri-RSRP' or 'none' for aperiodic CSI reporting, the UE is not expected to be configured with more than 16 CSI-RS resources in a CSI-RS resource set.

According to a possible embodiment, an antenna port is defined such that the channel over which a symbol on the antenna port is conveyed can be inferred from the channel over which another symbol on the same antenna port is conveyed.

Two antenna ports are said to be quasi co-located (QCL) if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters. Two antenna ports may be quasi-located with respect to a subset of the large-scale properties and different subset of large-scale properties may be indicated by a QCL Type. For example, qcl-Type may take one of the following values:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}.

Spatial Rx parameters may include one or more of: angle of arrival (AoA,) Dominant AoA, average AoA, angular spread, Power Angular Spectrum (PAS) of AoA, average AoD (angle of departure), PAS of AoD, transmit/receive channel correlation, transmit/receive beamforming, spatial channel correlation, etc.

An "antenna port" according to an embodiment may be a logical port that may correspond to a beam (resulting from beamforming) or may correspond to a physical antenna on a device. In some embodiments, a physical antenna may map directly to a single antenna port, in which an antenna port corresponds to an actual physical antenna. Alternately, a set or subset of physical antennas, or antenna set or antenna array or antenna sub-array, may be mapped to one or more antenna ports after applying complex weights, a cyclic delay, or both to the signal on each physical antenna. The physical antenna set may have antennas from a single module or panel or from multiple modules or panels. The weights may be fixed as in an antenna virtualization scheme, such as cyclic delay diversity (CDD). The procedure used to derive antenna ports from physical antennas may be specific to a device implementation and transparent to other devices.

Embodiment 1: Cascaded Indication of TCI State Subsets in MAC CE

In order to allow a UE to turn off some of UE antenna panels, a set of TCI states activated by a network entity should be associated with one or a few UE antenna panels. Since the network entity does not have knowledge of the association of a given beam of the network entity with a UE antenna panel at a given time, the UE can transmit an indication that a group or subset of TCI states are associated with a common UE antenna panel. Thus, the reference signals configured in each TCI state of the group of TCI states providing the QCL source and QCL type for a target DL transmission are received (e.g., satisfactory, above a threshold (e.g., RSRP)) by the common UE antenna panel.

A common UE antenna panel may be a physical or logical antenna array comprising a set of antenna elements or antenna ports that share a common or a significant portion of an RF chain (e.g., in-phase/quadrature (I/Q) modulator, analog to digital (A/D) converter, local oscillator, phase shift network). Communicating (receiving or transmitting) on at least a subset of antenna elements or antenna ports active for radiating energy (also referred to herein as active elements) of an antenna panel requires biasing or powering on of the RF chain which results in current drain or power consumption in the UE associated with the antenna panel (including power amplifier/low noise amplifier (LNA) power consumption associated with the antenna elements or antenna ports). The phrase "active for radiating energy," as used herein, is not meant to be limited to a transmit function but also encompasses a receive function. Accordingly, an antenna element that is active for radiating energy may be coupled to a transmitter to transmit radio frequency energy or to a receiver to receive radio frequency energy, either simultaneously or sequentially, or may be coupled to a transceiver in general, for performing its intended functionality. Communicating on the active elements of an antenna panel enables generation of radiation patterns or beams.

In one embodiment, a UE transmits an indication of one or more subsets of TCI states from a plurality of configured TCI states, wherein each TCI state subset of the one or more subsets of TCI states is associated with a common UE antenna panel (e.g. all downlink reference signals in a given subset of TCI states are received with a same UE antenna panel). In one implementation, the indication is based on UE-specific PUSCH MAC CE with a predefined logical channel identity (LCID) for UL-SCH MAC PDU subheader. For example, the TCI State Subsets indication for UE power saving is identified by a MAC PDU subheader with LCID as specified in Table 6.2.1-1 of 3GPP TS38.321 (one of the reserved indices is assigned for LCID value 'TCI State Subsets indication for UE power saving'). It has a variable size consisting of following fields:

Serving Cell ID: this field indicates the identity of the Serving Cell for which the MAC CE applies. The length of the field is 5 bits;

BWP ID: This field contains BWP-Id, as specified in 3GPP TS 38.331, of a downlink bandwidth part for which the MAC CE applies. The length of the BWP ID field is 2 bits;

$T_i$: if there is a TCI state with TCI-StateId i as specified in 3GPP TS 38.331, this field indicates whether the TCI state with TCI-StateId i belongs to a given TCI state subset or not. Otherwise MAC entity shall ignore the $T_i$ field. The $T_i$ field is set to "1" to indicate that the TCI state with TCI-StateId i is included in the given TCI state subset. The $T_i$ field is set to "0" to indicate that the TCI state with TCI-StateId i is not included in the given TCI state subset. If there is more than one TCI state subset, additional bytes corresponding to the indication of additional TCI state subsets are appended.

Bitmap based indication of TCI state subsets in a MAC CE can reduce the signaling overhead, compared to including a list of TCI state identities (e.g. TCI-StateId). For example, assuming that the maximum 128 TCI states can be configured for the UE, each TCI state ID requires 7 bits. If the TCI state IDs are directly included in the MAC CE or RRC message, the number of bits required for TCI state subsets indication (excluding reserved bits, serving cell ID, and bandwidth part ID) is 7 N, where N is a number of TCI states configured for the UE. With the bitmap based indication, if each TCI state can be included in one or more TCI state subsets (i.e. a given TCI state can be associated with one or more UE antenna panels, in other words, a DL RS in the given TCI state configuration can be received with the one or more UE antenna panels), the number of bits required for TCI state subsets indication is X N, where X is a number of UE antenna panels or a number of TCI state subsets (e.g. X=2 or 4).

Figure 3:
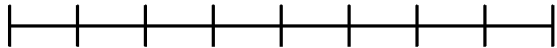
FIG. 3 is an exemplary indication of transmission configuration indicator state subsets for use in connection with user equipment power savings, in accordance with at least a further embodiment.

To further reduce the signaling overhead, cascaded indication of TCI state subsets can be employed with the restriction that a given TCI state can be included only in one TCI state subset. For example, as shown in FIG. 3, octet 2-octet 5 in the MAC CE indicates two TCI state groups, a first group indicated by the $T_i$ field set to "1" and a second group indicated by the $T_i$ field set to "0". Octet 6-octet 9 together with octet 2-octet 5 in the MAC CE indicate 4 TCI state subsets, where TCI state subset 1 and 2 belong to the first TCI state group and TCI state subset 3 and 4 belong to the second TCI state group. In octet 6-octet 9, if the $T_i$ field belonging to the first TCI state group is set to "1", the TCI state with TCI-StateId i is included in TCI state subset 1. If the $T_i$ field belonging to the first TCI state group is set to "0", the TCI state with TCI-StateId i is included in TCI state subset 2. TCI states for TCI state subset 3 and 4 are also indicated in a similar way. With cascaded indication, the signaling overhead for indication of 4 TCI state subsets can be reduced by half.

Figure 2:
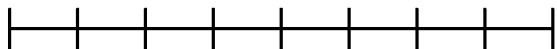
FIG. 2 is an exemplary indication of transmission configuration indicator state subsets for use in connection with user equipment power savings, in accordance with at least one embodiment.

FIG. 2 illustrates an exemplary indication 200 of transmission configuration indicator state subsets for use in connection with user equipment power savings, in accordance with at least one embodiment.

FIG. 3 illustrates an exemplary indication 300 of transmission configuration indicator state subsets for use in connection with user equipment power savings, in accordance with at least a further embodiment.

MAC CE based UE's recommendation/preferred for one or more subsets of TCI-states, where activation of TCI states selected from a given subset of TCI states enables UE power saving mode operation, has less signaling overhead and allows UE to frequently and quickly update the subset information, compared to a RRC-message based solution which includes a list of NZP-CSI-RS resource IDs (or SS/PBCH block IDs) or a list of TCI state IDs for a subset of TCI states. With UE's rotation, UE's receive antenna panel for a given gNB beam (equivalently, a given NZP-CSI-RS resource or a SS/PBCH block) and additionally UE's transmit antenna panel associated with the given gNB beam (i.e. a downlink reference signal resource) may change frequently. Thus, low overhead and low latency signaling based on MAC CE would be beneficial.

In one example, a TCI state subset is associated with a limited number UE antenna panels or array, e.g., one or a limited number of UE antenna panels smaller than the total number of UE antenna panels that can concurrently be active for radiating energy.

Embodiment 2: CSI Report Skipping

In one embodiment, a UE receives an indication of power saving mode operation via dynamic (e.g. MAC CE or DCI) or semi-static (e.g. RRC) signaling. For example, one reserved bit in TCI States Activation/Deactivation for UE-specific PDSCH MAC CE can be used to indicate whether UE is operated in power saving mode or not. For the UE to be able to turn off some of antenna panels, a network entity should activate TCI states only from a limited number of TCI state subsets, where each TCI state subset is associated with one or a reduced number of UE antenna panels. Thus, it is likely that the UE receives a new TCI state activation/deactivation MAC CE to enter into the power saving mode and the power saving mode indication can be signaled together with TCI state activation/deactivation indication.

In another embodiment, if a UE receives an indication of power saving mode operation, the UE does not take into account configured CSI resources for channel measurements which are associated with (or same as or for which the QCL source is the) DL RS in deactivated TCI states for some CSI estimation. Furthermore, the UE skips some of CSI reporting such as PMI/CQI/RI/LI reports for those CSI resources, although a corresponding CSI reporting configuration includes PMI, CQI, RI, and/or LI reporting. For beam management purpose, the UE continues to measures L1-RSRP for the CSI resources same as or for which the QCL source is the DL RS in deactivated TCI states. For NZP-CSI-RS which are received by a deactivated UE antenna panel, a network entity may continue transmitting the corresponding NZP-CSI-RS for other UEs in a cell. However, the UE may not compute detailed CSI information other than L1-RSRP for those NZP-CSI-RS (configured for channel measurements), since the DL beams associated with those NZP-CSI-RS may not be used immediately (e.g., for PDCCH/PDSCH transmission) during UE power saving mode.

In other embodiments, if a UE receives an indication of power saving mode operation, the UE employs a longer CSI reporting periodicity for periodic or semi-persistent CSI reporting. For the resource set associated with the deactivated antenna panels, it may be beneficial for UE CSI reporting to be performed less frequently, i.e., with a longer periodicity than would be configured in a non-power saving mode, especially, in periodic and semi-persistent CSI report configurations. This allows for further power savings and allows the UE to deactivate antenna panels for longer periods of time without needing to wake the deactivated panels up for measurements as frequently.

For example, for periodic report configuration, the parameter reportConfigType within CSI-ReportConfig is set to 'periodic'. For this report configuration, one aspect can be that when UE power saving mode is configured, if the higher layer reportQuanitity parameter within CSI-ReportConfig is set to 'cri-RI-PMI-CQI', 'cri-RI-i1', 'cri-RI-CQI', or 'cri-RI-LI-PMI-CQI', the UE is not required to perform CSI reporting. However, when reportQuantity is set to 'cri-RSRP' or 'ssb-Index-RSRP', UE shall perform CSI reporting.

Another aspect is to allow the UE to perform CSI reporting using larger periodicity than configured from higher layers for CSI report configuration comprising CSI resources associated with reference signal in deactivated TCI states. Such flexibility could be very important especially for CSI resource sets that are associated with deactivated antenna panels. For example, within CSI-ReportConfig the parameter reportSlotConfig of type CSI-ReportPeriodicityAndOffset dictates the periodicity at which the UE is expected to perform CSI reporting. CSI-ReportPeriodicityAndOffset data type can take on one of the following values: 'slots4', 'slots5', 'slots8', 'slots10', 'slots16', 'slots20', 'slots40', 'slots80', 'slots160', or 'slots320'. The value 'slotx' is an integer from an array of 0 to x−1 slots to indicate the slot offset with periodicity x slots. In a UE power saving mode, UE would benefit from not being required to report at the same periodicity. Instead, the UE could report at a larger periodicity. For example, if reportSlotConfig is set from higher layers to be 'slots8', UE can report at 'slots40' or 'slots20' instead. The specification can specify a minimum number of slots (i.e., a maximum periodicity) or a periodicity factor, f (e.g., multiply configured periodicity by f), which can depend on what value is reportSlotConfig is set to from higher layers. For example, if reportSlotConfig is set from higher layers to 'slots8', UE can only go as low as 'slots20' periodicity but not any lower, in terms of number of slots. In one example, a second periodicity value or a periodicity factor is configured for the UE in the CSI-ReportConfig to perform CSI reporting using larger second periodicity (than configured first periodicity for normal operation) for CSI report configuration comprising CSI resources associated with reference signal in deactivated TCI states. In one example, the CSI report slot offset configuration is not changed and kept the same for normal operation and UE power saving mode operation.

Embodiment 3: SRS Transmission Skipping

In one embodiment, when a UE is configured with a SRS resource set with the higher layer parameter usage in SRS-ResourceSet set as 'antennaSwitching' to allow a network entity to acquire DL CSI in an unpaired spectrum and if the UE receives an indication of power saving mode operation, the UE does not perform SRS transmissions on some of the configured SRS resources which belong to the SRS resource set with 'usage' set to 'antennaSwitching' and are associated with DL RS of deactivated TCI states. In one implementation, the UE receives spatial relation information of a given SRS resource, that is, association of the given SRS resource with a certain DL RS. Based on the received spatial relation information for configured SRS resources, the UE can determine which SRS resources the UE can skip SRS transmissions.

The present inventors have recognized, that a UE can transmit a MAC CE for recommendation of a group of TCI states that can be activated together for UE power saving. Cascaded indication of one or more subsets of TCI states in the MAC CE can inform gNB of association of gNB beams with UE antenna panels with low signaling overhead and low latency.

During power saving mode operation, UE can save power by skipping transmission of certain channel state information such as PMI/CQI/RI/LI reports for CSI resources associated with the deactivated TCI states, while evaluating L1-RSRP for all configured CSI resources for beam management. This allows quick transition of deactivated TCI states into activation if necessary, while reducing UE power consumption by reducing CSI computation and CSI reporting.

Figure 4:
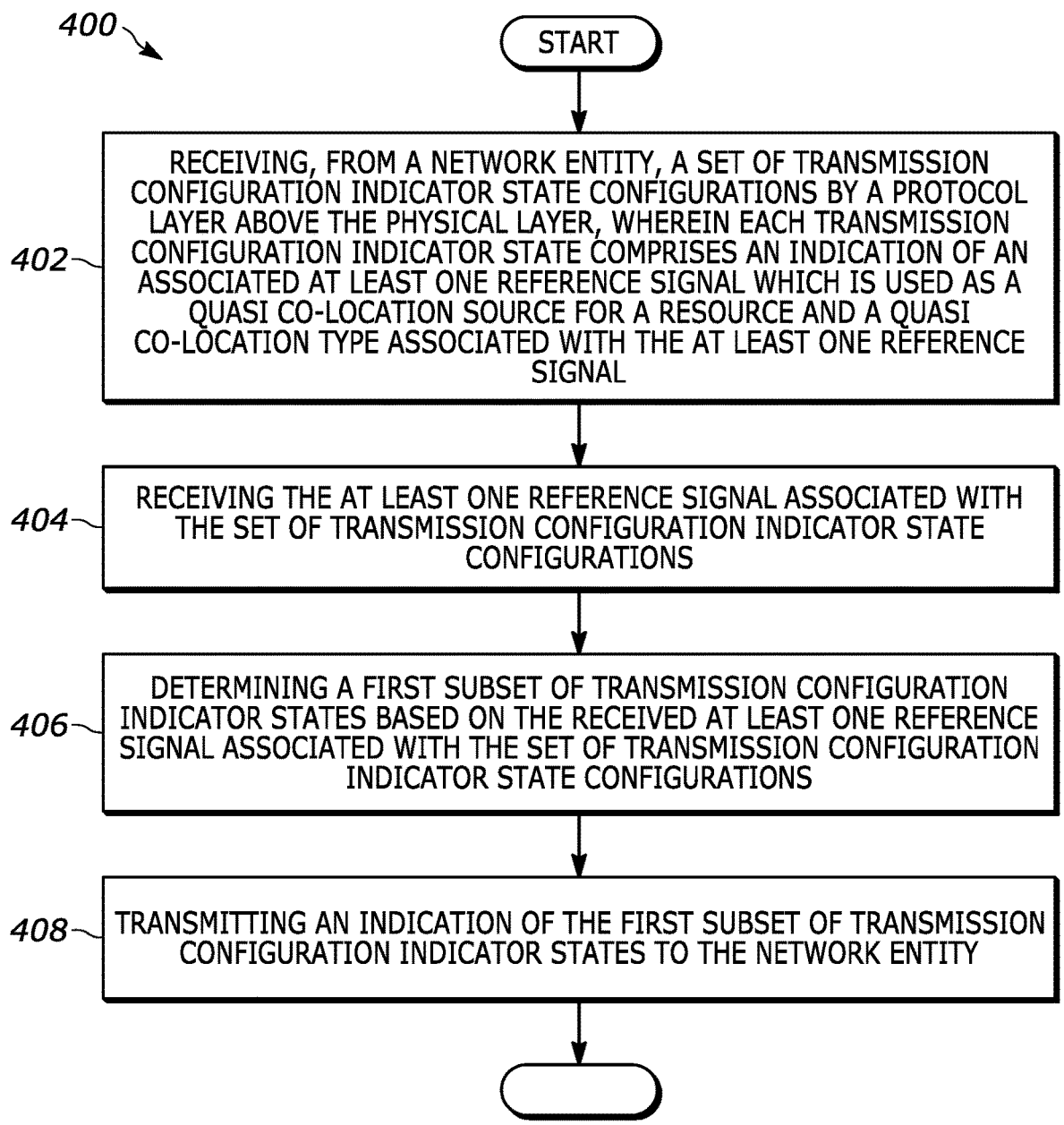
FIG. 4 is a flow diagram in a user equipment for identifying and reporting a subset of transmission configuration indicator states, which operate using a common subset of a plurality of antenna panels in the user equipment.

FIG. 4 illustrates a flow diagram 400 in a user equipment of a method for identifying and reporting a subset of transmission configuration indicator states, which operate using a common subset of a plurality of antenna panels in the user equipment. More specifically, a method in a user equipment having a plurality of antenna panels is provided. The method includes receiving 402, from a network entity, a set of transmission configuration indicator state configurations by a protocol layer above the physical layer, wherein each transmission configuration indicator state comprises an indication of an associated at least one reference signal which is used as a quasi co-location source for a resource and a quasi co-location type associated with the at least one reference signal. The at least one reference signal associated with the set of transmission configuration indicator state configurations are received 404, and a first subset of transmission configuration indicator states are determined 406 based on the received at least one reference signal associated with the set of transmission configuration indicator state configurations. An indication of the first subset of transmission configuration indicator states is transmitted 408 to the network entity.

In some instances, determining the first subset of transmission configuration indicator states based on the received at least one reference signal includes determining the first subset of transmission configuration indicator states based on the received at least one reference signal on a first antenna panel of the plurality of antenna panels. In some of these instances, the first antenna panel of the plurality of antenna panels is determined based on the received quality of the at least one reference signal on the plurality of antenna panels.

In others of these instances, a second subset of transmission configuration indicator states is determined based on the received at least one reference signal associated with the set of transmission configuration indicator state configurations on a second antenna panel of the plurality of antenna panels, and an indication of the second subset of transmission configuration indicator states is transmitted to the network entity. The indicated second subset of transmission configuration indicator states in some instances can be associated with the second antenna panel of the plurality of antenna panels.

In some instances, transmitting the indication of the first subset of transmission configuration indicator states to the network entity includes transmitting the indication of the first subset of transmission configuration indicator states in a medium access control-control element of a physical uplink shared channel.

In some instances, multiple subsets of transmission configuration indicator states including at least the first subset of transmission configuration indicator states are determined based on the received at least one reference signal associated with the set of transmission configuration indicator state configurations, where each of the multiple subsets of transmission configuration indicator states is respectively associated with a corresponding one of the plurality of antenna panels. In some of these instances, the indication of the first subset of transmission configuration indicator states includes an identification of the transmission configuration indicator states where the transmission indicator states identified are associated with a first group of the plurality of antenna panels and the transmission indicator states not identified are alternatively associated with a second group of the plurality of antenna panels; and wherein a further cascaded indication transmitted to the network entity identifies which transmission configuration indicator states are alternatively associated with a particular one of two subgroups within each of the first and second groups of the plurality of antenna panels.

In other of these instances, the first group can identify the transmission configuration indicator states associated with a first antenna panel and a second antenna panel, where the first subgroup of the first group corresponds to the transmission configuration indicator states associated with a first antenna panel, and the second subgroup of the first group corresponds to the transmission configuration indicator states associated with a second antenna panel; and wherein the second group identifies the transmission configuration indicator states associated with a third antenna panel and a fourth antenna panel, where the first subgroup of the second group corresponds to the transmission configuration indicator states associated with the third antenna panel, and the second subgroup of the second group corresponds to the transmission configuration indicator states associated with the fourth antenna panel.

In still other of these instances, a transmission configuration indicator state activation medium access control—control element can be received, which activates a selected subset of transmission configuration indicator states of the set of transmission configuration indicator state configurations, wherein the selected subset of transmission configuration indicator states is based upon transmission configuration indicator states associated with a subset of the plurality of antenna panels, and the antenna panels, which are not represented in the selected subset of transmission configuration indicator states, are operated in a power saving mode.

In some of these instances, a set of channel state information reporting settings is received, wherein each channel state information reporting setting comprises resource settings of channel state information resource sets for channel state information measurement, reporting configuration parameters, and reporting quantities for reporting channel state information. A subset of channel state information reporting settings is determined wherein each channel state information resource in the channel state information resource sets is associated with at least one of the at least one reference signal associated with the activated selected subset of transmission configuration indicator states. Channel state information for each of the subset of channel state information reporting settings is determined based on the associated resource settings, and reporting quantities for the corresponding channel state information reporting settings, and the determined channel state information is transmitted for each of the subset of channel state information reporting settings based on the reporting configuration parameters for the corresponding channel state information reporting setting.

Sometimes, the reporting quantity for the subset of channel state information reporting settings is set to a reporting setting value other than a reporting setting value for a layer 1 reference signal receive power. Sometimes, the subset of channel state information reporting settings is a first subset of channel state information reporting settings of the set of channel state information reporting settings, and a second subset of channel state information reporting settings are determined from the set of channel state information reporting settings, wherein each of the channel state information reporting settings of the second subset of channel state information reporting settings comprises reporting quantity set to a value other than a reporting setting value for a layer 1 reference signal receive power.

In some of these instances, channel state information reporting is disabled for channel state information reporting settings in the second subset of channel state information reporting settings but not in the first subset of channel state information reporting settings. In some of the same or other of these instances, a power-saving periodicity reporting configuration parameter is applied for channel state information reporting settings in the second subset of channel state information reporting settings but not in the first subset of channel state information reporting settings. In some of the same or other of these instances, a power-saving periodicity factor is applied to the periodicity reporting configuration parameter for channel state information reporting settings in the second subset of channel state information reporting settings but not in the first subset of channel state information reporting settings.

In some instances, when the user equipment is configured with a sounding reference signal, the user equipment can skip sounding reference signal transmissions on the sounding reference signal resources having a usage setting set to antenna switching and which are associated with downlink reference signals of transmission configuration indicator states associated with antenna panels operating in power saving mode.

Figure 5:
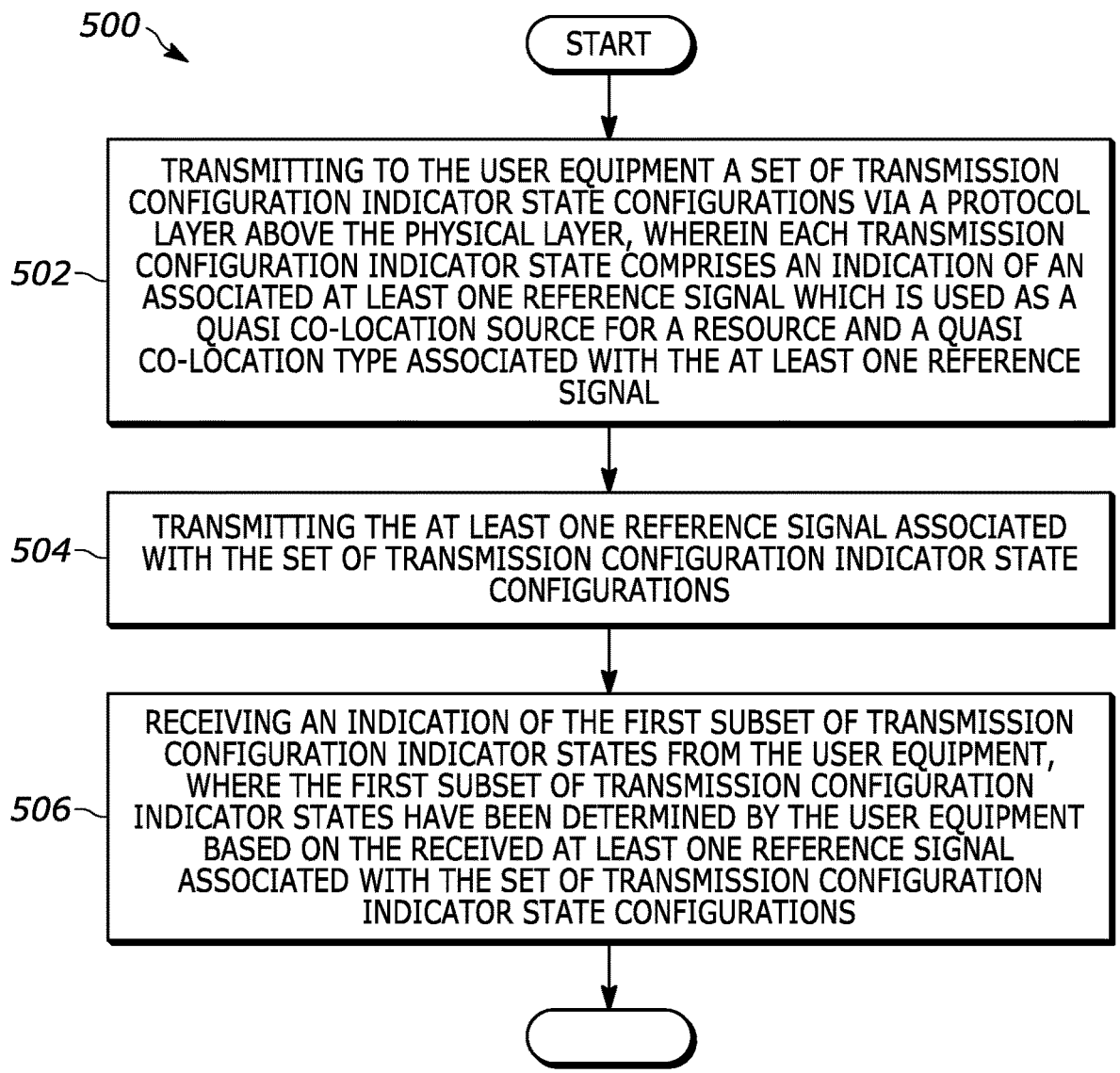
FIG. 5 is a flow diagram in a network entity of receiving an indication of a subset of transmission configuration indicator states from a particular user equipment which are associated with a common subset of a plurality of antenna panels in the user equipment.

FIG. 5 illustrates a flow diagram 500 of a method in a network entity of receiving an indication of subset of transmission configuration indicator states from a particular user equipment which are associated with a common subset of a plurality of antenna panels in the user equipment. The method includes transmitting 502 to the user equipment a set of transmission configuration indicator state configurations via a protocol layer above the physical layer, wherein each transmission configuration indicator state comprises an indication of an associated at least one reference signal which is used as a quasi co-location source for a resource and a quasi co-location type associated with the at least one reference signal. The at least one reference signal associated with the set of transmission configuration indicator state configurations is transmitted 504. An indication of a first subset of transmission configuration indicator states from the user equipment is received 506, where the first subset of transmission configuration indicator states have been determined by the user equipment based on the received at least one reference signal associated with the set of transmission configuration indicator state configurations.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 6:
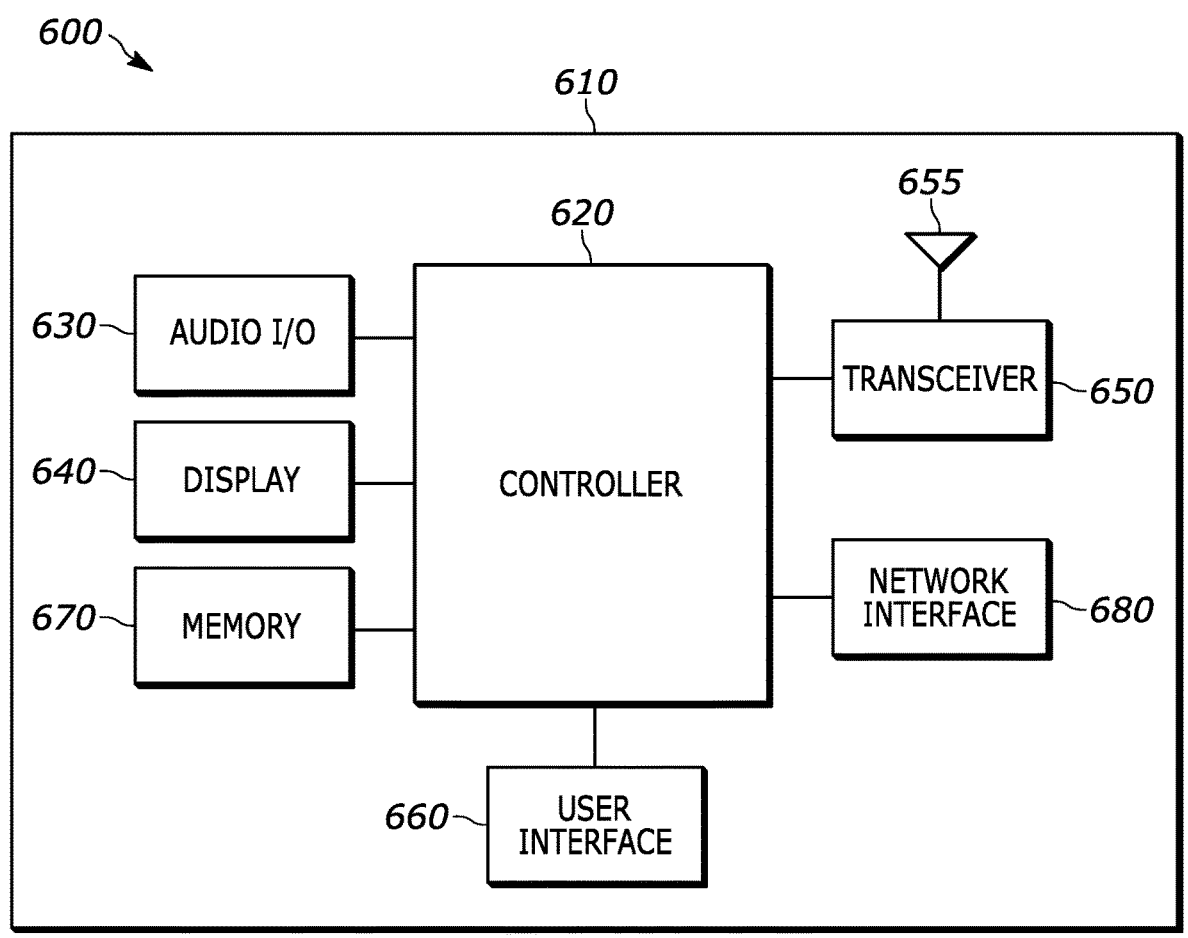
FIG. 6 is an example block diagram of an apparatus according to a possible embodiment.

FIG. 6 is an example block diagram of an apparatus 600, such as the wireless communication device 110, according to a possible embodiment. The apparatus 600 can include a housing 610, a controller 620 within the housing 610, audio input and output circuitry 630 coupled to the controller 620, a display 640 coupled to the controller 620, a transceiver 650 coupled to the controller 620, an antenna 655 coupled to the transceiver 650, a user interface 660 coupled to the controller 620, a memory 670 coupled to the controller 620, and a network interface 680 coupled to the controller 620. The apparatus 600 can perform the methods described in all the embodiments.

The display 640 can be a viewfinder, a liquid crystal display (LCD), a light emitting diode (LED) display, a plasma display, a projection display, a touch screen, or any other device that displays information. The transceiver 650 can include a transmitter and/or a receiver. The audio input and output circuitry 630 can include a microphone, a speaker, a transducer, or any other audio input and output circuitry. The user interface 660 can include a keypad, a keyboard, buttons, a touch pad, a joystick, a touch screen display, another additional display, or any other device useful for providing an interface between a user and an electronic device. The network interface 680 can be a Universal Serial Bus (USB) port, an Ethernet port, an infrared transmitter/receiver, an IEEE 1394 port, a WLAN transceiver, or any other interface that can connect an apparatus to a network, device, or computer and that can transmit and receive data communication signals. The memory 670 can include a random access memory, a read only memory, an optical memory, a solid state memory, a flash memory, a removable memory, a hard drive, a cache, or any other memory that can be coupled to an apparatus.

The apparatus 600 or the controller 620 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 670 or elsewhere on the apparatus 600. The apparatus 600 or the controller 620 may also use hardware to implement disclosed operations. For example, the controller 620 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 620 may be any controller or processor device or devices capable of operating an apparatus and implementing the disclosed embodiments. Some or all of the additional elements of the apparatus 600 can also perform some or all of the operations of the disclosed embodiments.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of,"" "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

What is claimed is:

1. A method in a network entity comprising:
   transmitting to a user equipment a set of transmission configuration indicator state configurations via a protocol layer above the physical layer, wherein each transmission configuration indicator state comprises an indication of an associated at least one downlink reference signal which is used as a quasi co-location source for a resource and a quasi co-location type associated with the at least one downlink reference signal;
   transmitting the at least one downlink reference signal associated with the set of transmission configuration indicator state configurations;
   receiving an indication of a first subset of transmission configuration indicator states from the user equipment, where the indication of the first subset includes identifying the particular transmission configuration indicator states that are part of the first subset, based on the at least one downlink reference signal associated with the set of transmission configuration indicator state configurations.

2. The method of claim 1, wherein the first subset of transmission configuration indicator states based on the at least one downlink reference signal includes a determination that the first subset of transmission configuration indicator states correspond to the at least one downlink reference signal received by the user equipment on a first antenna panel of a plurality of antenna panels.

3. The method of claim 2, wherein the first antenna panel of the plurality of antenna panels is determined by the user equipment, based on the received quality of the at least one downlink reference signal via the plurality of antenna panels.

4. The method of claim 1, further comprising sending a power saving mode indication to the user equipment that the user equipment is operated in a power saving mode, wherein receiving the indication of the first subset of transmission configuration indicator states from the user equipment includes receiving the indication of the first subset of transmission configuration indicator states in response to sending the power saving mode indication.

5. The method of claim 1, further comprising:
   receiving an indication of a second subset of transmission configuration indicator states from the user equipment, where the indication of the second subset includes identifying the particular transmission configuration indicator states based on the at least one downlink reference signal associated with the set of transmission configuration indicator state configurations received by the user equipment on a second antenna panel of the plurality of antenna panels.

6. The method of claim 5, wherein the indicated second subset of transmission configuration indicator states is associated in the user equipment with the second antenna panel of the plurality of antenna panels.

7. The method of claim 1, wherein multiple subsets of transmission configuration indicator states including at least the first subset of transmission configuration indicator states are determined by the user equipment based on the at least one downlink reference signal associated with the set of transmission configuration indicator state configurations, where each of the multiple subsets of transmission configuration indicator states is respectively associated in the user equipment with a corresponding one of the plurality of antenna panels.

8. The method of claim 7, wherein the indication of the first subset of transmission configuration indicator states includes an identification of the transmission configuration indicator states where the transmission configuration indicator states identified are associated with a first group of the plurality of antenna panels and the transmission configuration indicator states not identified are alternatively associated in the user equipment with a second group of the plurality of antenna panels; and wherein a further cascaded indication received by the network entity identifies which transmission configuration indicator states are alternatively associated with a particular one of two subgroups within each of the first and second groups of the plurality of antenna panels.

9. The method of claim 8, wherein the first group identifies the transmission configuration indicator states associated with a first antenna panel and a second antenna panel, where the first subgroup of the first group corresponds to the transmission configuration indicator states associated with a first antenna panel, and the second subgroup of the first group corresponds to the transmission configuration indicator states associated with a second antenna panel; and wherein the second group identifies the transmission configuration indicator states associated with a third antenna panel and a fourth antenna panel, where the first subgroup of the second group corresponds to the transmission configuration indicator states associated with the third antenna panel, and the second subgroup of the second group corresponds to the transmission configuration indicator states associated with the fourth antenna panel.

10. The method of claim 7, further comprising:
    transmitting a transmission configuration indicator state activation medium access control-control element for activating a selected subset of transmission configuration indicator states of the set of transmission configuration indicator state configurations, wherein the selected subset of transmission configuration indicator states is based upon transmission configuration indicator states associated with a subset of the plurality of antenna panels; and wherein the antenna panels, which are not represented in the selected subset of transmission configuration indicator states, can be operated by the user equipment in a power saving mode.

11. The method of claim 10, further comprising:
transmitting a set of channel state information reporting settings, wherein each channel state information reporting setting comprises resource settings of channel state information resource sets for channel state information measurement, reporting configuration parameters, and reporting quantities for reporting channel state information; and
receiving the determined channel state information for each of a subset of channel state information reporting settings based on reporting configuration parameters for a corresponding channel state information reporting setting;
wherein the subset of channel state information reporting settings are determined by the user equipment wherein each channel state information resource in the channel state information resource sets is associated with at least one of the at least one downlink reference signal associated with the activated selected subset of transmission configuration indicator states; and
wherein channel state information for each of the subset of channel state information reporting settings based on the associated resource settings, and reporting quantities for the corresponding channel state information reporting settings, are determined by the user equipment.

12. The method of claim 11, wherein the reporting quantity for the subset of channel state information reporting settings is set to a reporting setting value other than a reporting setting value for a layer 1 reference signal receive power.

13. The method of claim 11, further comprising:
wherein the subset of channel state information reporting settings is a first subset of channel state information reporting settings of the set of channel state information reporting settings, and
a second subset of channel state information reporting settings from the set of channel state information reporting settings are determined by the user equipment, wherein each of the channel state information reporting settings of the second subset of channel state information reporting settings comprises a reporting quantity set to a value other than a reporting setting value for a layer 1 reference signal receive power.

14. The method of claim 13, further comprising:
channel state information reporting, which is disabled for channel state information reporting settings in the second subset of channel state information reporting settings but not in the first subset of channel state information reporting settings.

15. The method of claim 13, further comprising:
wherein a power-saving periodicity reporting configuration parameter for channel state information reporting settings is applied in the second subset of channel state information reporting settings but not in the first subset of channel state information reporting settings.

16. The method of claim 13, further comprising:
wherein a power-saving periodicity factor to the periodicity reporting configuration parameter for channel state information reporting settings is applied in the second subset of channel state information reporting settings but not in the first subset of channel state information reporting settings.

17. The method of claim 10, wherein when the user equipment is configured with a sounding reference signal, the user equipment skips sounding reference signal transmissions on the sounding reference signal resources having a usage setting set to antenna switching and which are associated with downlink reference signals of transmission configuration indicator states associated with antenna panels operating in power saving mode.

18. A network entity comprising:
a controller; and
a transceiver that transmits, to a user equipment, a set of transmission configuration indicator state configurations by a protocol layer above the physical layer, wherein each transmission configuration indicator state comprises an indication of an associated at least one downlink reference signal which is used as a quasi co-location source for a resource and a quasi co-location type associated with the at least one downlink reference signal, and that transmits the at least one downlink reference signal associated with the set of transmission configuration indicator state configurations; and
wherein the transceiver further receives an indication of the first subset of transmission configuration indicator states from the user equipment, where the indication of the first subset includes identifying the particular transmission configuration indicator states that are part of the first subset, based on the at least one downlink reference signal associated with the set of transmission configuration indicator state configurations.

19. The user equipment of claim 18, wherein multiple subsets of transmission configuration indicator states including at least the first subset of transmission configuration indicator states are determined by the user equipment based on the at least one downlink reference signal associated with the set of transmission configuration indicator state configurations, where each of the multiple subsets of transmission configuration indicator states is respectively associated in the user equipment with a corresponding one of the plurality of antenna panels;
wherein the transceiver further transmits a transmission configuration indicator state activation medium access control-control element for activating a selected subset of transmission configuration indicator states of the set of transmission configuration indicator state configurations, wherein the selected subset of transmission configuration indicator states is based upon transmission configuration indicator states associated with a subset of the plurality of antenna panels; and
wherein the antenna panels, which are not represented in selected subset of transmission configuration indicator states, can be operated by the user equipment in a power saving mode.

20. The user equipment of claim 19, wherein the transceiver further transmits a set of channel state information reporting settings, wherein each channel state information reporting setting comprises resource settings of channel state information resource sets for channel state information measurement, reporting configuration parameters, and reporting quantities for reporting channel state information; and the transceiver further receives the determined channel state information for each of a subset of channel state information reporting settings based on reporting configuration parameters for a corresponding channel state information reporting setting;
   wherein the subset of channel state information reporting settings are determined by the user equipment wherein each channel state information resource in the channel state information resource sets is associated with the at least one downlink reference signal associated with the activated selected subset of transmission configuration indicator states, and channel state information for each of the subset of channel state information reporting settings based on the associated resource settings, and reporting quantities for the corresponding channel state information reporting setting are determined by the user equipment.

* * * * *